(12) United States Patent
Oizumi

(10) Patent No.: US 9,242,484 B2
(45) Date of Patent: Jan. 26, 2016

(54) RECORDING APPARATUS

(71) Applicant: SEIKO EPSON CORPORATION, Tokyo (JP)

(72) Inventor: Takao Oizumi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 307 days.

(21) Appl. No.: 13/910,558

(22) Filed: Jun. 5, 2013

(65) Prior Publication Data

US 2013/0328984 A1    Dec. 12, 2013

(30) Foreign Application Priority Data

Jun. 8, 2012   (JP) .................. 2012-130482

(51) Int. Cl.
| | |
|---|---|
| B41J 11/58 | (2006.01) |
| B41J 13/10 | (2006.01) |
| B41J 29/02 | (2006.01) |
| B41J 29/13 | (2006.01) |
| H04N 1/00 | (2006.01) |

(52) U.S. Cl.
CPC .................. *B41J 11/58* (2013.01); *B41J 13/10* (2013.01); *B41J 29/02* (2013.01); *B41J 29/13* (2013.01); *H04N 1/00535* (2013.01); *H04N 2201/0081* (2013.01); *H04N 2201/0082* (2013.01)

(58) Field of Classification Search
CPC ............ B41J 11/58; B41J 11/00; B41J 29/02; B41J 29/13; B41J 13/00; B41J 13/0018; H04N 1/00535
USPC ......................................................... 347/104
See application file for complete search history.

(56) References Cited

U.S. PATENT DOCUMENTS

2006/0085946 A1 *   4/2006   Hattori et al. ................... 16/221

FOREIGN PATENT DOCUMENTS

JP       2004-040627        2/2004

* cited by examiner

*Primary Examiner* — Geoffrey Mruk
*Assistant Examiner* — Scott A Richmond
(74) *Attorney, Agent, or Firm* — Workman Nydegger

(57) ABSTRACT

A recording apparatus includes a pivotal member provided on a casing so as to pivot between a closed position in which the pivotal member covers at least a part of the casing and an open position in which the pivotal member is away from the closed position, a tray member disposed so as to pivot with respect to the casing and to be pressed to the open position by a pivoting motion of the pivotal member toward the open position, and a resetting device that cancels the pressing force of the pivotal member when the pivotal member is made to pivot toward the closed position, to thereby reset the tray member to the closed position.

5 Claims, 12 Drawing Sheets

RECORDING APPARATUS

BACKGROUND

1. Technical Field

The present invention relates to a recording apparatus.

2. Related Art

Some of existing recording apparatuses include a manual feed tray, for example as found in JP-A-2004-40627 (in particular, paragraph 0043). The recording apparatus according to JP-A-2004-40627 includes a pair of manual feed trays, one superposed on the other, and when the upper manual feed tray is opened the lower one is also opened in linkage.

The configuration according to JP-A-2004-40627 allows the pair of manual feed trays to open in linkage. However, the closing motion of the manual feed trays is not linked. In particular, the manual feed tray may be open despite that the manual feed tray is not about to be used. In such a case, it is desirable that the manual feed tray is closed (reset) automatically. With a multi-function recording apparatus having a scanner unit for example, when the scanner unit is made to swing about its pivotal shaft for replacing an ink cartridge or removing a jammed paper sheet, the manual feed tray provided behind the scanner unit is laid down backward and thus opened. In this case, since the user has not intentionally opened the manual feed tray, the user is prone to overlook that the manual feed tray is open.

SUMMARY

Accordingly, an advantage of some aspects of the invention is that a recording apparatus is provided that allows a tray member to be reset to a closed position with a closing motion of a pivotal member.

In an aspect, the invention provides a recording apparatus including a casing, a pivotal member provided on the casing so as to pivot between a closed position in which the pivotal member covers at least a part of the casing and an open position in which the pivotal member is away from the closed position, a tray member disposed so as to pivot between an open position and a closed position with respect to the casing, and to be pressed to the open position by a pivoting motion of the pivotal member toward the open position, and a resetting device that cancels the pressing force of the pivotal member when the pivotal member is made to pivot toward the closed position, to thereby reset the tray member to the closed position.

With the mentioned configuration, when the pivotal member is made to pivot from the closed position to the open position, the pivotal member presses, upon reaching the open position, the tray member to the open position. Conversely, when the pivotal member is made to pivot from the open position to the closed position, the tray member is reset to the closed position by the resetting device. Therefore, the tray member can be prevented from being left in the open position when the pivotal member returns to the open position. Thus, the tray member is prevented from being unintentionally left open.

In the foregoing recording apparatus, preferably, the resetting device may include a biasing device, and apply, when the pivotal member is moved toward the open position, a biasing force of the biasing device to the tray member so as to urge the tray member toward the closed position when the tray member is at an intermediate position between the open position and the closed position, and the resetting device may cancel the pressing force of the pivotal member to the tray member and maintain the tray member in the open position, after the tray member is set to the open position from the intermediate position against the biasing force of the resetting device.

With the mentioned configuration, the tray member is subjected to the biasing force of the biasing device exerted toward the closed position, when the tray member is at the intermediate position. Then when the tray member is set to the open position from the intermediate position, the tray member is released from the biasing force of the biasing device, thus to so far in the open position.

In the foregoing recording apparatus, preferably, the tray member may be configured to support a medium to be fed therefrom, disposed so as to pivot about a pivotal shaft located between a downstream edge and an upstream of the medium in the transport direction of the medium placed on the tray member, and may include a contact portion located at a downstream end portion in the transport direction to be brought into contact with the resetting device. The resetting device may be configured to apply the biasing force of the biasing device to the contact portion, and to release the contact portion from the biasing device when the tray member is set to the open position from the intermediate position, to thereby maintain the tray member in the open position free from the biasing force of the biasing device.

With the mentioned configuration, when the tray member is moved toward the open position from the intermediate position, the contact portion of the tray member rotates against the biasing force of the biasing device. As the tray member is moved further toward the open position, the contact portion is disengaged from the biasing device. Then the contact portion is no longer subjected to the biasing force of the biasing device. Accordingly, the tray member can be maintained in the open position. Thus, the tray member can be maintained in the intermediate position and the open position, in addition to the closed position.

In the foregoing recording apparatus, preferably, the pivotal member may be a scanner unit that can be opened and closed with respect to the casing, and the tray member may be a manual feed tray on which a recording medium is placed each time the recording medium is put to use, the manual feed tray being independent from a paper feed tray capable of receiving a plurality of recording media and configured to feed the recording media to a splitting mechanism that allows only a single piece of recording medium to be delivered.

With the mentioned configuration, when the scanner unit is made to pivot to the open position and then returned to the closed position, the manual feed tray is automatically returned to the closed position by the resetting device. Therefore, the manual feed tray can be prevented from being left in the open position. Generally the manual feed tray is located behind the scanner unit from the viewpoint of the user, and hence the user is prone to overlook that the manual feed tray has been opened. However, since the manual feed tray is automatically returned to the closed position by the resetting device, the manual feed tray can be prevented from being left in the open position.

In the foregoing recording apparatus, preferably, the pivotal member may be a cover member that can be opened and closed with respect to the casing, the cover member being set to cover an upper face of the casing in the closed position, and the tray member may be a manual feed tray on which a recording medium is placed each time the recording medium is put to use, the manual feed tray being independent from a paper feed tray capable of receiving a plurality of recording media and configured to feed the recording media to a splitting mechanism that allows only a single piece of recording medium to be delivered.

With the mentioned configuration, when the cover member is made to pivot to the open position and then returned to the closed position, the manual feed tray is automatically returned to the closed position by the resetting device. Therefore, the manual feed tray can be prevented from being left in the open position. In this case also, the manual feed tray is often located behind the cover member from the viewpoint of the user, and hence the user is prone to overlook that the manual feed tray has been opened. However, since the manual feed tray is automatically returned to the closed position by the resetting device, the manual feed tray can be prevented from being left in the open position.

In the foregoing recording apparatus, preferably, the pivotal member may be an automatic feed mechanism that transports a source document to a position where an image sensor reads the source document, and the tray member may be a manual feed tray on which a recording medium is placed each time the recording medium is put to use, the manual feed tray being independent from a paper feed tray capable of receiving a plurality of recording media and configured to feed the recording media to a splitting mechanism that allows only a single piece of recording medium to be delivered.

With the mentioned configuration, when the automatic feed mechanism is made to pivot to the open position and then returned to the closed position, the manual feed tray is automatically returned to the closed position by the resetting device. Therefore, the manual feed tray can be prevented from being left in the open position. In this case also, the manual feed tray is often located behind the automatic feed mechanism from the viewpoint of the user, and hence the user is prone to overlook that the manual feed tray has been opened. However, since the manual feed tray is automatically returned to the closed position by the resetting device, the manual feed tray can be prevented from being left in the open position.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
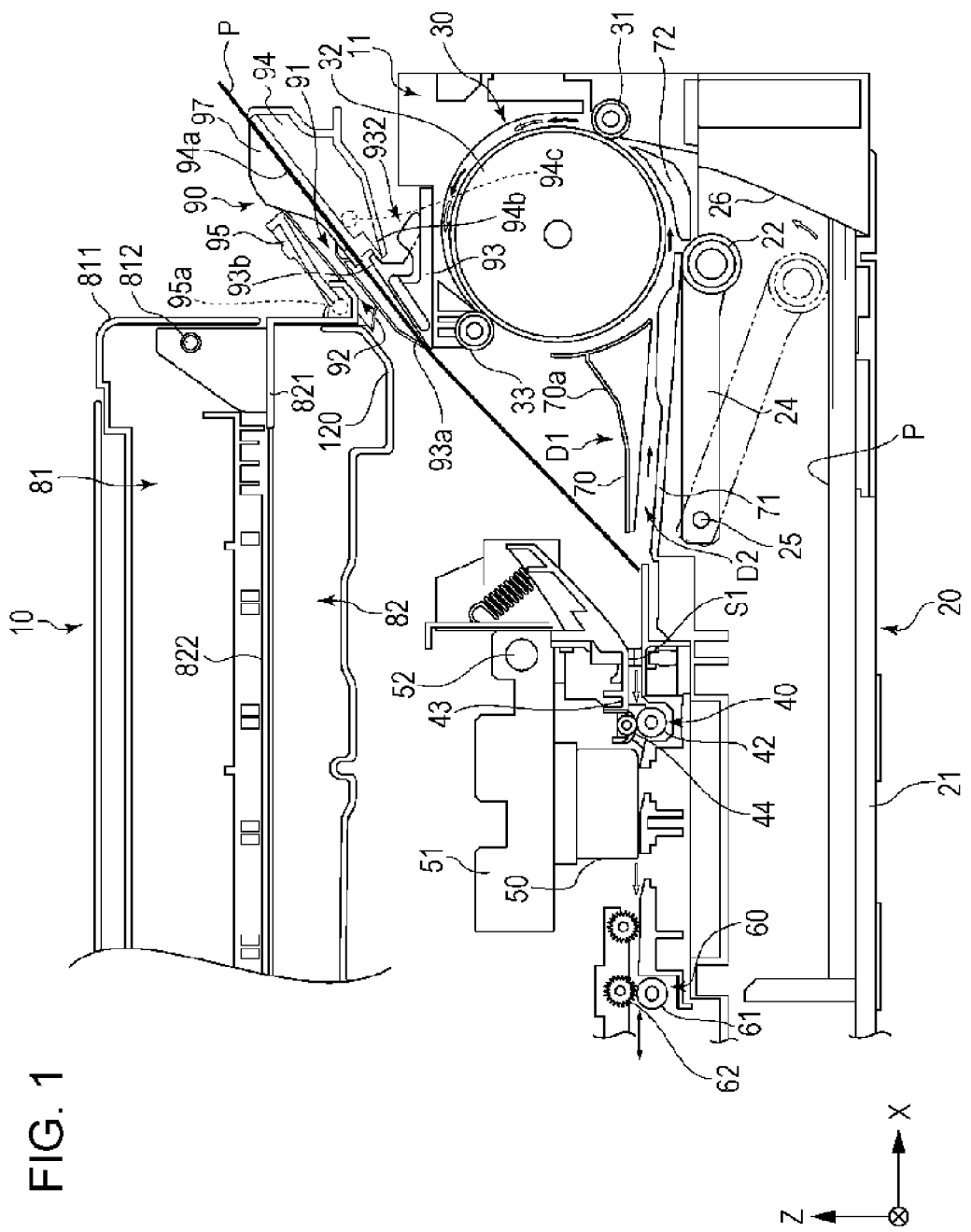
FIG. 1 is a cross-sectional view showing a transport route in a recording apparatus according to a first embodiment.

Hereafter, a recording apparatus 10 according to a first embodiment of the invention will be described referring to the drawings.

Configuration of Recording Apparatus 10

FIG. 1 is a cross-sectional view showing a transport route of a recording sheet P in the recording apparatus 10. The recording sheet P, which exemplifies the recording medium according to the invention, may be different material for recording, such as a film-like material. In addition, the term "recording" herein employed will include printing.

In the following description, an XYZ orthogonal coordinate system may be employed as shown in FIG. 1. Specifically, with respect to the direction in which the recording sheet P is transported (hereinafter, transport direction), a component parallel to the plane on which the recording apparatus 10 is placed will be defined as X-direction, a direction departing from the plane on which the recording apparatus 10 is placed will be defined as Z-direction, and a direction orthogonal to both the X-direction and the Z-direction will be defined as Y-direction. In addition, the direction of an intermediate roller 32 seen from a recording head 50 in FIG. 1 will be referred to as back side, and conversely the direction of the recording head 50 seen from the intermediate roller 32 will be referred to as front side. Regarding the plane on which the recording apparatus 10 is placed, the side of the recording apparatus 10 seen from that plane will be referred to as upper side, and the side of the plane seen from the recording apparatus 10 will be referred to as lower side. Further, a direction connecting the front side and the back side will be referred to as front-back direction.

The recording apparatus 10 may be an ink jet printer for example, however the invention may be applied to different recording apparatuses. In addition, the ink jet printer may adopt any ejecting mechanism as long as recording is performed by ejecting an ink.

Although FIG. 1 illustrates some rollers provided in the transport route of the recording sheet P, those rollers are not always located at the same positions in the width direction (Y-direction) of the recording apparatus 10.

The recording apparatus 10 includes a casing 11, which includes a front feed mechanism 20. The recording apparatus 10 transports the recording sheet P from the front feed mechanism 20 toward the recording head 50, and discharges the recording sheet P to the downstream side after the recording head 50 performs the recording. The front feed mechanism 20 includes a sheet cassette 21 and a pickup roller 22. The sheet cassette 21 can receive a plurality of recording sheets P stacked on each other. The pickup roller 22, which is driven to rotate by a motor (not shown), is attached to an arm member 24. The arm member 24 is set to swing about a pivotal shaft 25. The pickup roller 22 is made to rotate in contact with the recording sheet P placed in the sheet cassette 21, to thereby deliver the uppermost one of the stacked recording sheets P to a splitting member 26 described below, out of the sheet cassette 21.

The splitting member 26 is located in the recording apparatus 10 on the back side and upper side of the sheet cassette 21. The splitting member 26 serves to be engaged with the leading edge of the uppermost one of the recording sheets P delivered by the pickup roller 22, to thereby guide the recording sheet P backward and upward. By the engagement between the splitting member 26 and the recording sheet P, the uppermost one and the second and subsequent ones of the recording sheets P are split from each other.

The recording sheet P delivered from the front feed mechanism 20 is transported to a guide roller unit 30. The guide roller unit 30 includes a roller 31, an intermediate roller 32, and an assist roller 33. The roller 31 and the intermediate roller 32 serve to split the uppermost recording sheet P, in case that two or more recording sheets P intrude therebetween. To be more detailed, the roller 31 has a rotational resistance greater than the friction between the recording sheets P, so as to split the uppermost recording sheet P from the so faring ones. Here, the roller 31 may also serve as an assist roller, in addition to the splitting roller.

The assist roller 33 is located downstream of the roller 31 in the transport direction. The assist roller 33 is a slave roller made to rotate by the intermediate roller 32, and pinches the recording sheet P in collaboration with the intermediate roller 32 to guide the recording sheet P to the downstream side in the transport direction.

In addition, a sheet transport mechanism 40 and a sheet discharge mechanism 60 are provided downstream of the guide roller unit 30 in the transport direction of the recording sheet P. The sheet transport mechanism 40 includes a transport motor 41 (see FIG. 10), a transport drive roller 42, a transport support member 43, and a transport slave roller 44. The transport drive roller 42 is driven by the transport motor 41. The transport slave roller 44 is pivotally supported by the transport support member 43 and pressed against the transport drive roller 42, and the transport drive roller 42 causes the transport slave roller 44 to rotate. By the mechanism thus configured, the recording sheet P is transported toward the recording head 50.

A sheet edge sensor S1 is provided on the transport support member 43 located upstream of the sheet transport mechanism 40. The sheet edge sensor S1 serves to detect the position of the leading edge and the trailing edge of the recording sheet P.

Figure 10:
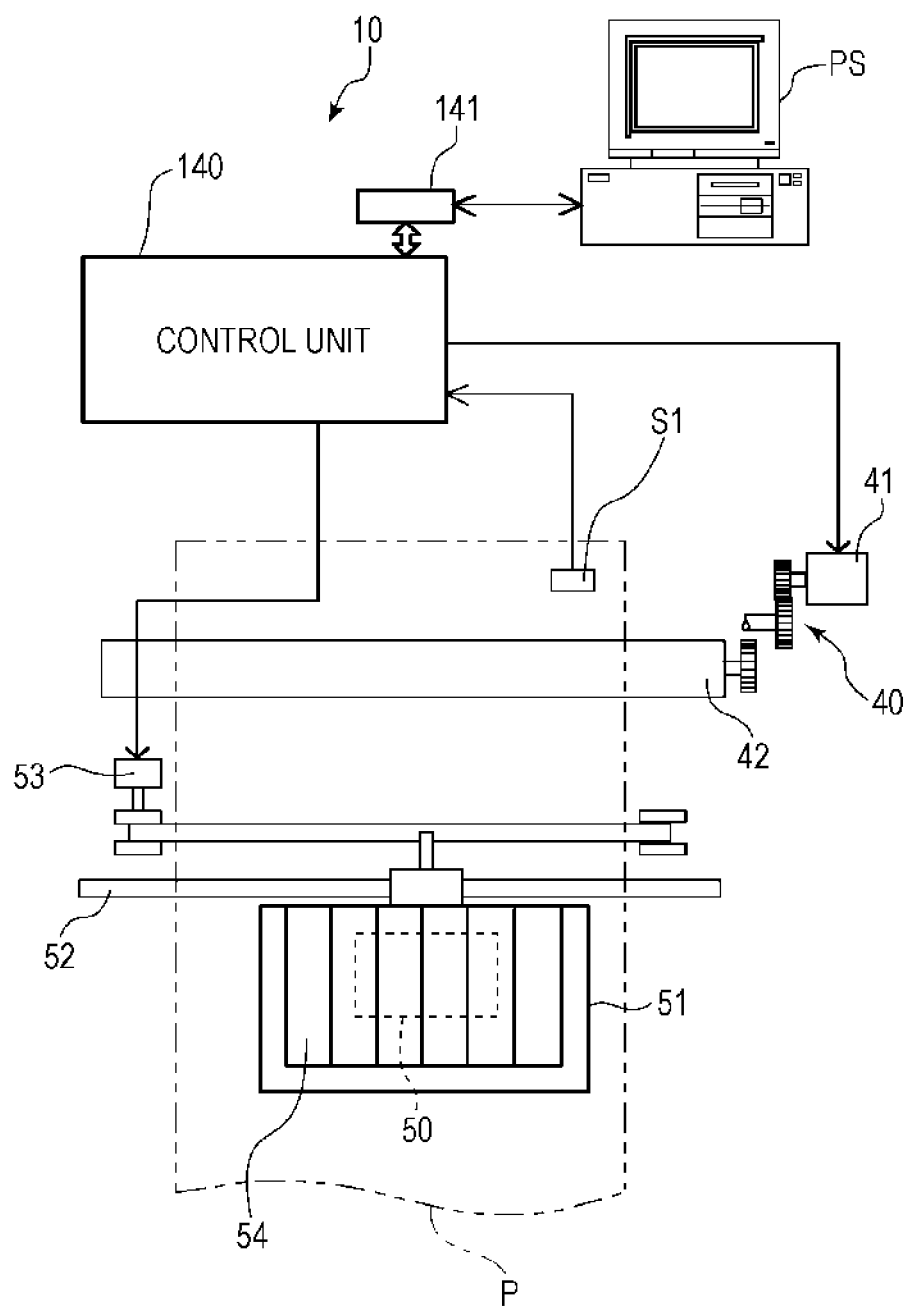
FIG. 10 is a schematic diagram showing a general configuration of the recording apparatus.

A recording head 50 is provided on the upper side of the recording sheet P, at a position downstream of the sheet transport mechanism 40 in the transport direction of the recording sheet P. The recording head 50 is attached to the lower face of a carriage 51. The carriage 51 is driven by a carriage motor 53 (see FIG. 10) to reciprocate in the main scanning direction (width direction, Y-direction) of the recording apparatus 10 along a carriage shaft 52 extending in the main scanning direction. Here, as shown in FIG. 10, the carriage 51 includes cartridges 54 loaded with, for example, ink of yellow (Y), magenta (M), cyan (C), and black (K) respectively, and the cartridges 54 supply the ink to the recording head 50 so that the recording head 50 ejects the ink onto the recording sheet P.

The sheet discharge mechanism 60 is located downstream of the recording head 50 in the transport direction of the recording sheet P. The sheet discharge mechanism 60 includes a discharge motor (not shown), a discharge drive roller 61, and a discharge slave roller 62. The discharge drive roller 61 is driven to rotate by the discharge motor, and the discharge slave roller 62 pressed against the discharge drive roller 61 is made to rotate. The recording sheet P transported further downstream of the sheet discharge mechanism 60 is delivered to a discharged sheet tray (not shown).

The recording apparatus 10 according to this embodiment has a duplex printing function, which will be described referring to FIG. 1. A sheet guide member 70 is provided on the front side of the intermediate roller 32. The sheet guide member 70 includes a transport surface 70a downwardly inclined from a predetermined height in the up-down direction (Z-direction) of the intermediate roller 32 toward the front side. The transport surface 70a constitutes a front transport route D1.

In addition, a frame member 71 is provided below the sheet guide member 70. The frame member 71 is opposed to the sheet guide member 70 with a clearance therebetween that allows the recording sheet P to pass through. The end portion of the frame member 71 on the back side extends to vicinity of the lower end portion of the intermediate roller 32, and a reversing guide member 72 is disposed to oppose the frame member 71. The respective upper faces of the frame member 71 and the reversing guide member 72 constitute a reversing transport route D2 that feeds the recording sheet P from the front side to the back side, and the recording sheet P guided by the reversing transport route D2 is fed to the nip between the intermediate roller 32 and the roller 31.

When the recording sheet P, transported along the front transport route D1 to the position below the recording head 50 and subjected to the recording (printing) operation, is returned to the back side, the recording sheet P is transported along the reversing transport route D2. Thus, the recording sheet P is reversed from the state in which the recording sheet P first passed through the guide roller unit 30, when the recording sheet P again passes through the guide roller unit 30 after being transported along the reversing transport route D2. The recording sheet P thus reversed is again transported to the position below the recording head 50 along the front transport route D1, and the duplex printing is performed on the recording sheet P.

The recording apparatus 10 includes a scanner unit 80, exemplifying the pivotal member according to the invention. The scanner unit 80 includes an automatic feed mechanism 81 and a scanner mechanism 82. The automatic feed mechanism 81 serves to automatically feed the recording sheet P to the reading position. The automatic feed mechanism 81 has a casing 811, which supports the structure of the automatic feed mechanism 81. In addition, the automatic feed mechanism 81 is configured so as to pivot with respect to the scanner mechanism 82 about a bearing 812 provided on the back-side end portion of the automatic feed mechanism 81. The face of the casing 811 opposing the scanner mechanism 82 serves as a cover for a source document table 822 of the scanner mechanism 82.

The scanner mechanism 82 serves to read a document placed on the source document table 822, with an image sensor. The scanner mechanism 82 includes a casing 821, the source document table 822, a carriage and the image sensor. The casing 821 supports the structure of the scanner mechanism 82. The source document table 822 is constituted of a flat transparent material such as glass placed on the upper surface of the casing 821, so that a document can be placed on the source document table 822. The carriage is provided with the image sensor that reads an image recorded on the document, and driven to move inside the casing 821 by a driving mechanism which is not shown.

The scanner mechanism 82 is configured so as to pivot with respect to the casing 11 of the recording apparatus 10 about a bearing (not shown) provided on the back-side end portion of the scanner mechanism 82. In this embodiment, the bearing is located in an extended portion 823 (see FIG. 2) formed to extend backward from the casing 821. Such a structure allows the scanner mechanism 82 to pivot with respect to the casing 11 of the recording apparatus 10.

When the scanner mechanism 82 is made to pivot about the bearing, the automatic feed mechanism 81 attached to the scanner mechanism 82 via the bearing 812 in the casing 811 is also made to pivot together. Thus, the scanner unit 80 is configured to pivot about the bearing, so as to assume a closed position shown in FIGS. 2 and 4 and an open position shown in FIGS. 3 and 5.

Figure 2:
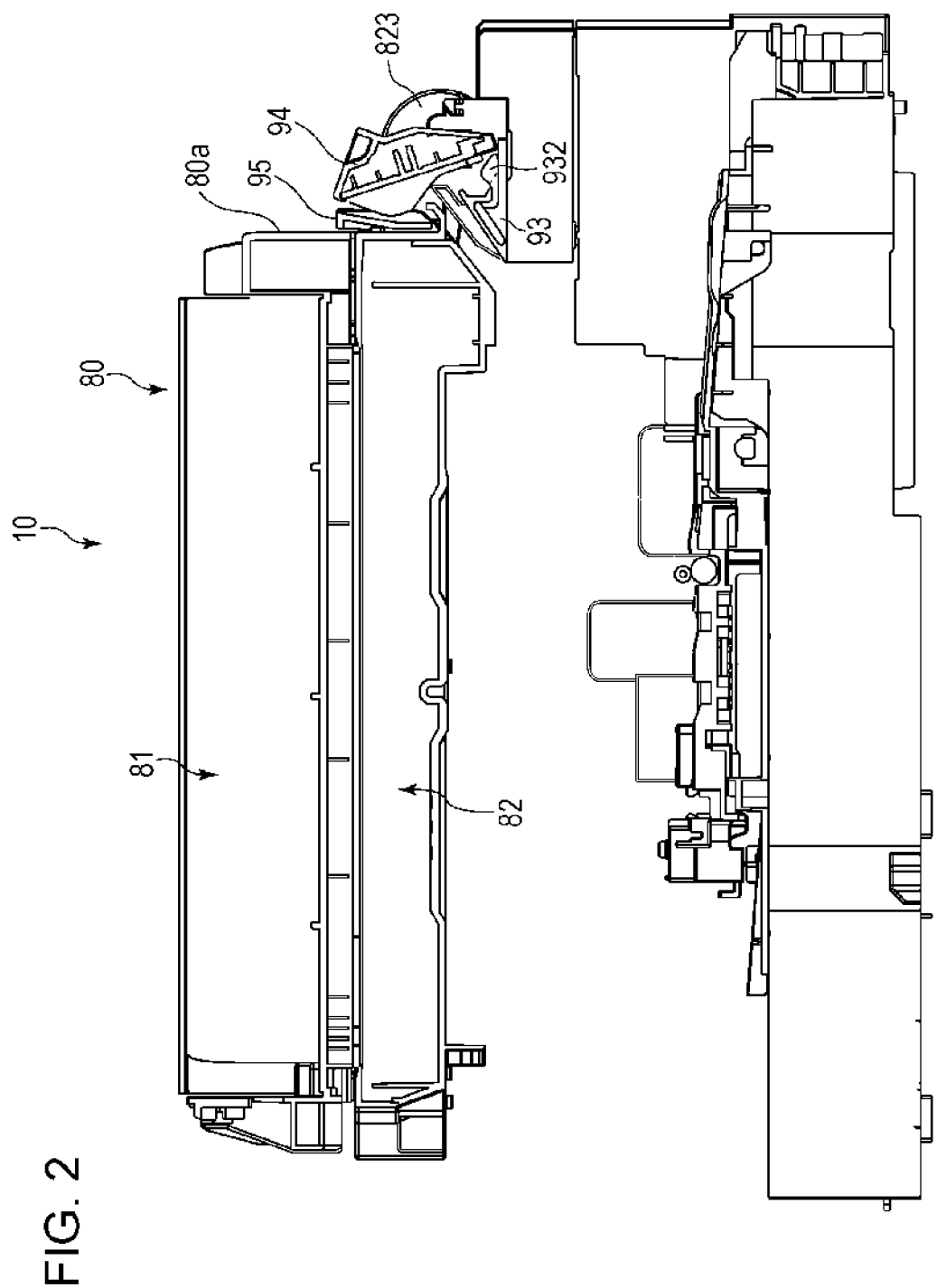
FIG. 2 is a side view of the recording apparatus in which a scanner unit is closed.
Figure 3:
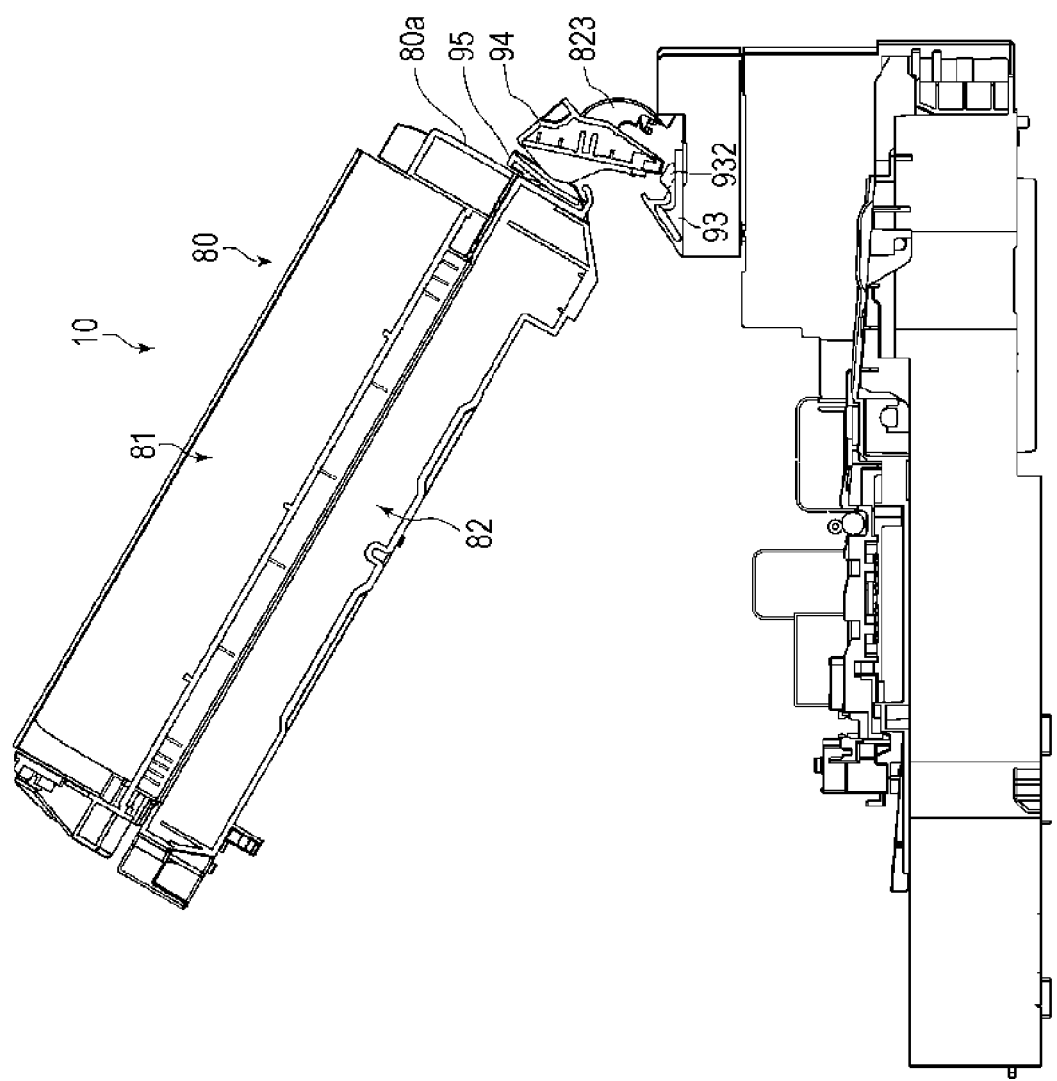
FIG. 3 is a side view of the recording apparatus in which the scanner unit is open.
Figure 4:
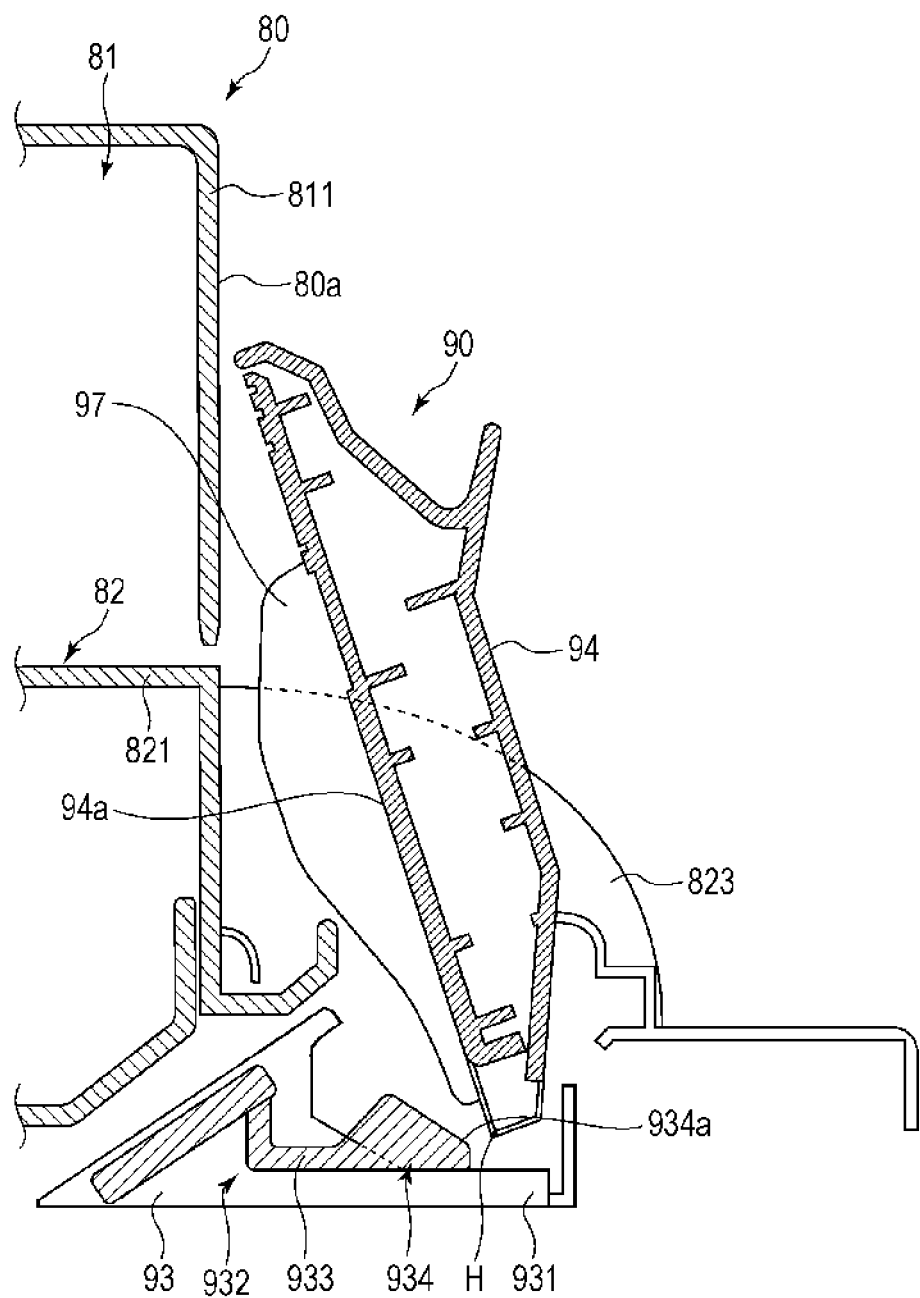
FIG. 4 is a fragmentary cross-sectional view of the recording apparatus in which the scanner unit and a manual feed tray are closed.
Figure 5:
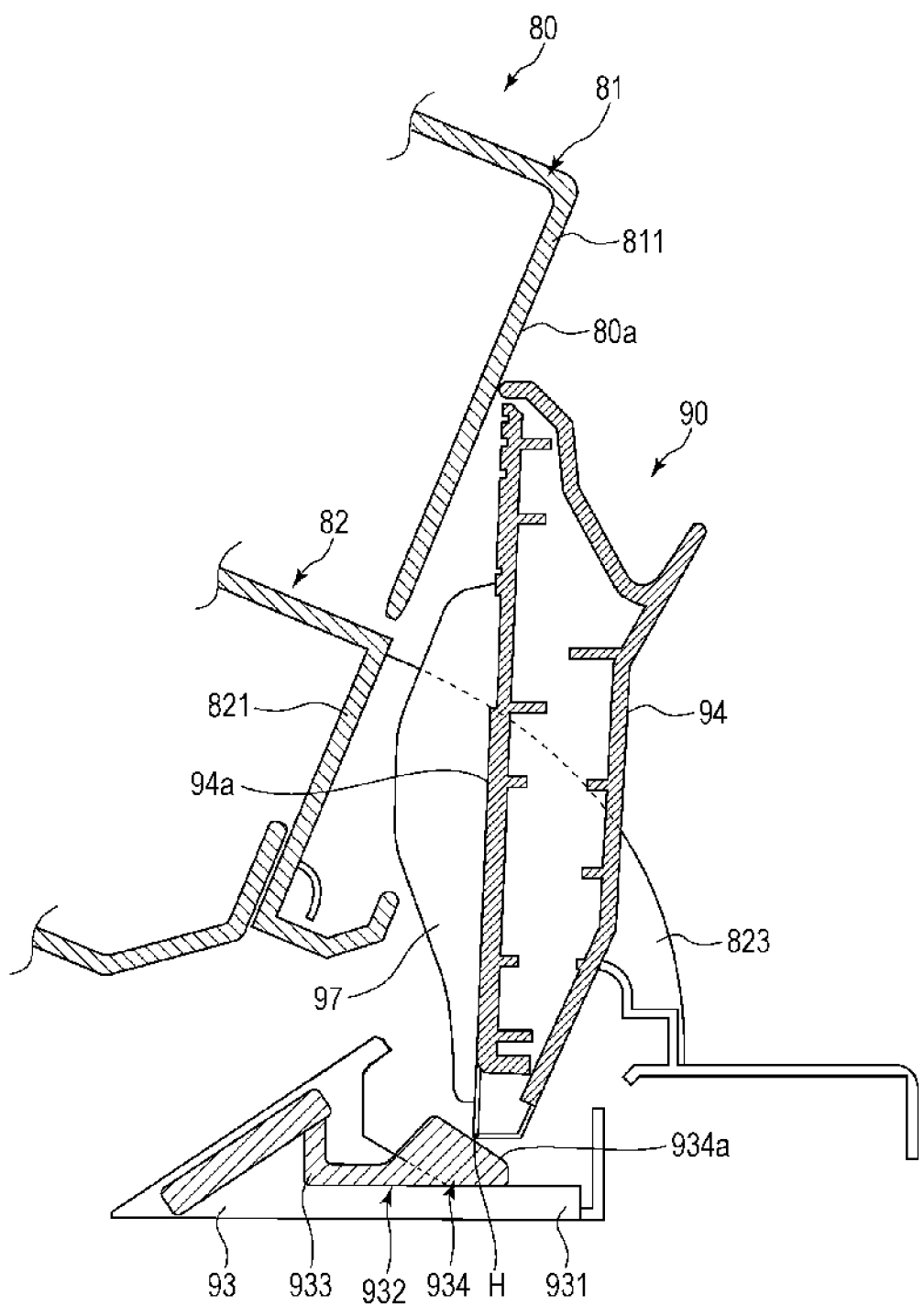
FIG. 5 is a fragmentary cross-sectional view of the recording apparatus in which the scanner unit is open.
Figure 6:
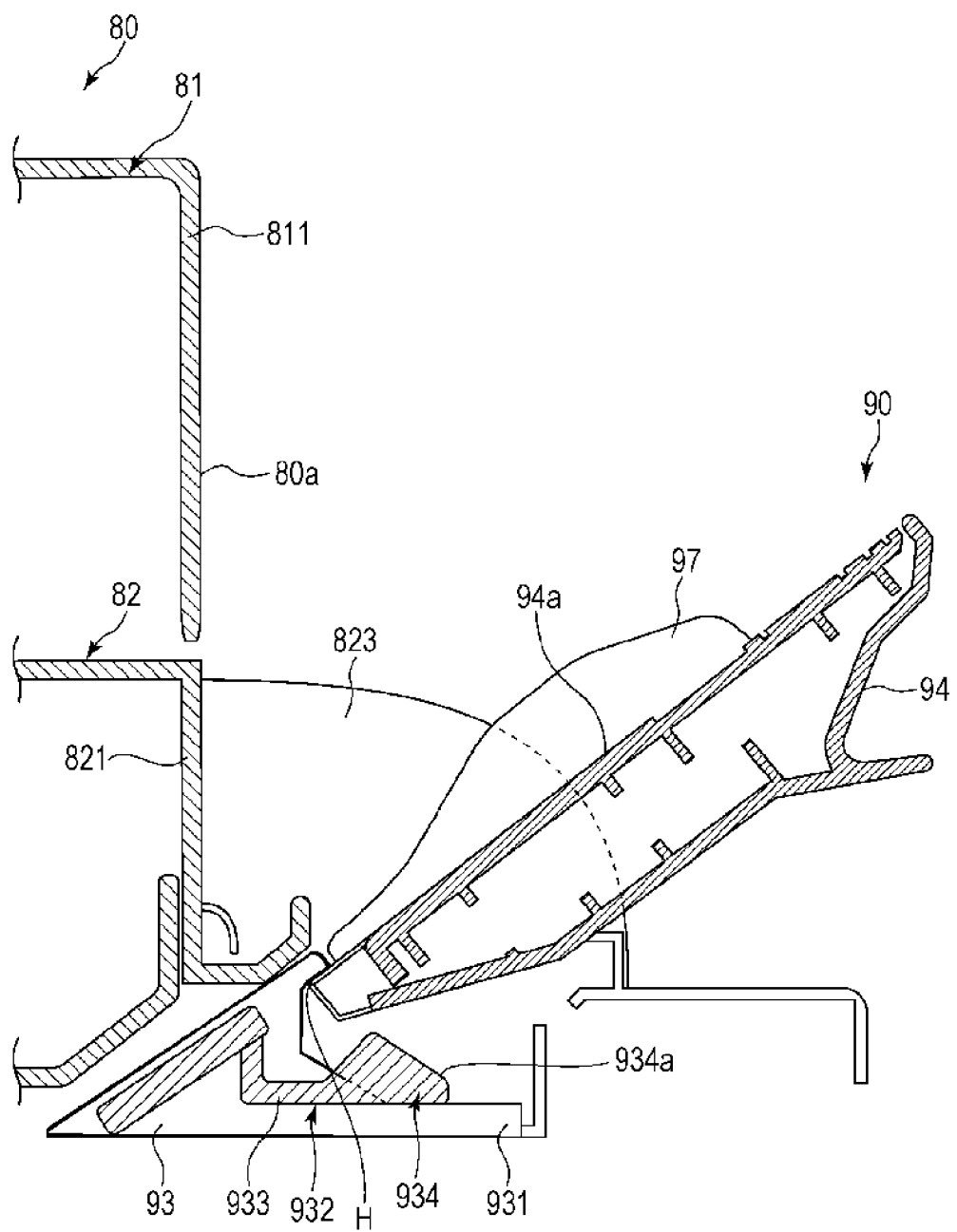
FIG. 6 is a fragmentary cross-sectional view of the recording apparatus in which the manual feed tray is open.

FIG. 2 is a side view of the recording apparatus 10, in which the scanner unit 80 and a manual feed tray 94 are closed. FIG. 3 is a side view of the recording apparatus 10 in which the scanner unit 80 is open, showing a state in which the manual feed tray 94 is pressed by the scanner unit 80. FIG. 4 illustrates a state in which both the scanner unit 80 and the manual feed tray 94 are closed. FIG. 5 illustrates a state in which the manual feed tray 94 is retained by a resetting member 932 to be subsequently described, when the scanner unit 80 is open. FIG. 6 illustrates a state in which the manual feed tray 94 is open though the scanner unit 80 is closed.

Manual Feed Guide Mechanism 90

Hereunder, description will be made on a manual feed guide mechanism 90. The manual feed guide mechanism 90 is located on the back side of the recording apparatus 10, and serves to guide a recording sheet P manually inserted into the manual feed guide mechanism 90, into inside the recording apparatus 10.

The manual feed guide mechanism 90 serves to guide the recording sheet P when the recording sheet P is about to be inserted into the recording apparatus 10 through a manual feed slot 91 (see FIG. 1) provided on the back side thereof. The manual feed guide mechanism 90 includes a tray body 92, an openable cover 95, and an upper guide member 120. The tray body 92 includes a tray base 93 and a manual feed tray 94 exemplifying the tray member according to the invention. As shown in FIG. 1, the tray base 93 is located above the intermediate roller 32. In addition, the tray base 93 includes the resetting member 932, which will be subsequently described in details.

The manual feed tray 94, corresponding to the tray member in the invention, serves for inserting a recording sheet P each time the recording sheet P is put to use, and is independent from a paper feed tray, such as the sheet cassette 21, capable of receiving a plurality of recording sheets P and configured to feed the recording sheet P to a splitting mechanism that allows only a single piece of recording sheet P to be delivered. The splitting mechanism herein referred to includes mechanisms capable of splitting the recording sheets P, such as the combination of the roller 31 and the intermediate roller 32. In addition, a paper feed tray different from the sheet cassette 21 may be employed.

An engaging end 94b (see FIG. 1), which is the end portion of the manual feed tray 94 on the front side, is disposed so as to contact the upper end portion 93b (see FIG. 1) of the tray base 93. A pivotal shaft 94c (see FIG. 1) rotatably supported by a lateral support member (not shown) is provided for the manual feed tray 94. The manual feed tray 94 also includes a guide surface 94a that guides the recording sheet P inserted, formed on the surface of the manual feed tray 94 that is exposed when the manual feed tray 94 is in the open position as shown in FIGS. 1 and 5. When the upper surface of the engaging end 94b is engaged with the upper end portion 93b of the tray base 93, i.e., when the manual feed tray 94 is open, the guide surface 94a of the manual feed tray 94 and a slope portion 93a (see FIGS. 1 and 7) of the tray base 93 are aligned so as to smoothly guide the recording sheet P.

Further, the manual feed tray 94 includes a pair of support members 97 located on the respective sides of the guide surface 94a. The pair of support members 97 is configured to symmetrically move closer to or away from each other in the width direction of the guide surface 94a, to thereby suppress the recording sheet P from tilting while being transported, for different widths of the recording sheet P. Although it is preferable that the guide surface 94a and the slope portion 93a are inclined at generally the same angle, the inclination angles may be different provided that the recording sheet P can be smoothly guided.

As shown in FIG. 1, the openable cover 95 is provided above the tray base 93 and the manual feed tray 94, with a predetermined clearance from the tray base 93 and the manual feed tray 94. A pivotal shaft 95a, rotatably supported by a support member (not shown), is provided for the openable cover 95, to allow the openable cover 95 to pivot about the pivotal shaft 95a. The openable cover 95 prevents, in the open position, intrusion of foreign matters into the recording apparatus 10.

When the manual feed tray 94 is closed as shown in FIGS. 2 and 4, the upper end portion of the front-side surface of the manual feed tray 94 is located forward of the position taken when the manual feed tray 94 is open (see FIG. 6). Here, the upper end portion of the back face 95b of the openable cover 95 is in contact with the support member 97 of the manual feed tray 94, and hence when the manual feed tray 94 is closed the openable cover 95 is also closed. When the openable cover 95 is closed, a positioning portion projecting from the front-side surface of the openable cover 95 is made to abut the back-side end face 80a of the scanner unit 80. Accordingly, the openable cover 95 assumes an upright position in the vertical direction (Z-direction), and the manual feed tray 94 engaged with the openable cover 95 can also maintain the closed position.

Resetting Member 932

Figure 7:
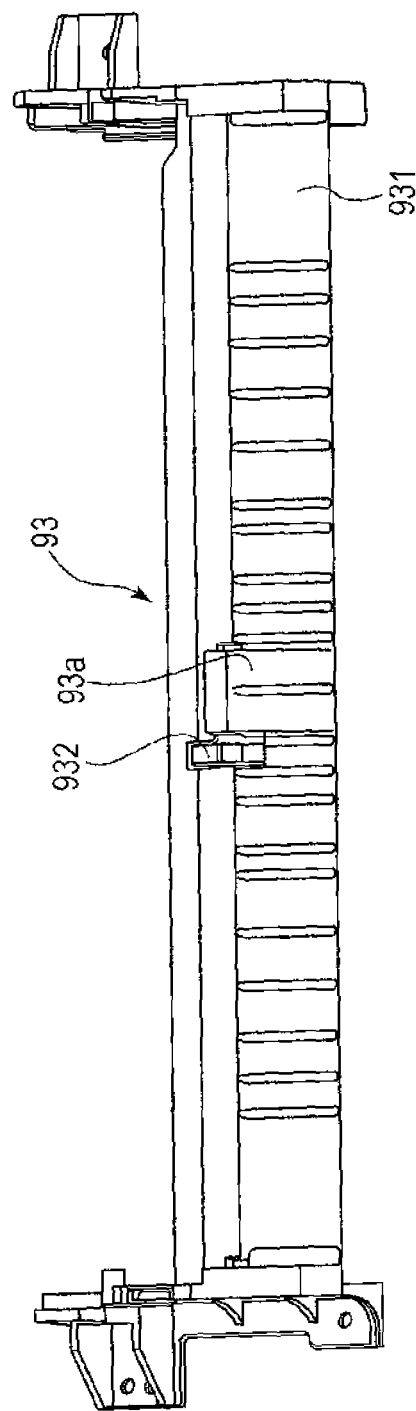
FIG. 7 is a perspective view showing a configuration of a tray base.
Figure 8:
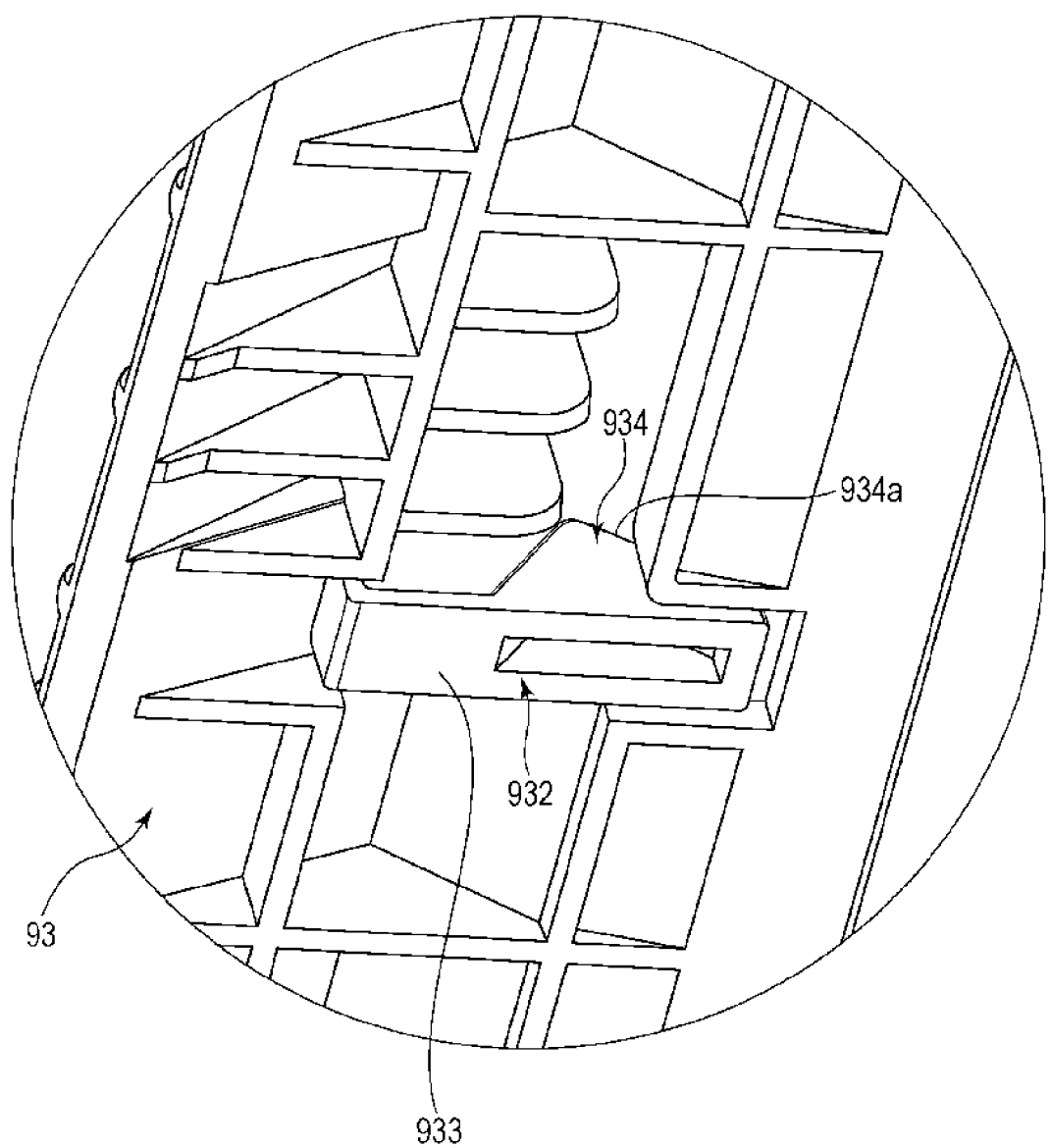
FIG. 8 is an enlarged fragmentary perspective view of the tray base from the back.

FIG. 7 is a perspective view showing a configuration of the tray base 93. FIG. 8 is an enlarged fragmentary perspective view of the tray base 93 from the back. As shown in FIG. 7, the tray base 93 includes a main body 931, and the slope portion 93a inclined downward from the back side toward the front side, located on the main body 931.

As shown in FIGS. 1 through 8, the resetting member 932, exemplifying the resetting device according to the invention, is provided at a central portion of the tray base 93 in the width direction. The resetting member 932 includes a plate-shaped portion 933 and an abutment portion 934. The plate-shaped portion 933 is formed of a generally L-shaped plate as shown in FIG. 5, and corresponds to the biasing device according to the invention. The plate-shaped portion 933 is formed to be elastically deflected depending on the engagement status between the abutment portion 934 and the manual feed tray 94, as will be subsequently described.

The abutment portion 934 is a portion continuously extending from the plate-shaped portion 933. As shown in FIGS. 7 and 8, the abutment portion 934 has a shape upwardly protruding from the plate-shaped portion 933. The abutment portion 934 includes a sloped surface 934a that serves as a sliding surface. The sloped surface 934a is inclined upward from the upstream side toward the downstream side. The inclination angle of the sloped surface 934a is defined as follows. When the manual feed tray 94 is made to pivot about the pivotal shaft 94c, the lower end portion of the manual feed tray 94 is made to abut the sloped surface 934a. Hereinafter, the portion in the lower end portion of the manual feed tray 94 that contacts the sloped surface 934a will be referred to as contact portion H. Then when the manual feed tray 94 is laid down in the opening direction, the contact portion H is displaced upward to the downstream side, during which the contact portion H interferes with the sloped surface 934a.

Figure 9:
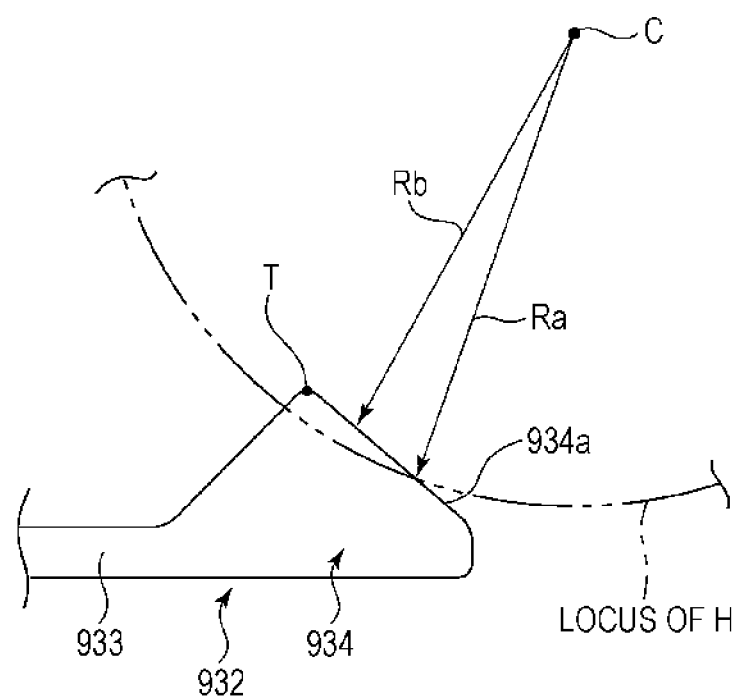
FIG. 9 is a diagram showing a movement of a contact portion of the manual feed tray with respect to a hook portion.

This process will be described referring to FIG. 9. FIG. 9 illustrates the abutment portion 934 and the plate-shaped portion 933 not yet deflected, and indicates the locus of the contact portion H of the manual feed tray 94 made to pivot about the pivotal shaft 94c, with a dot-dot-dash line. As shown in FIG. 9, while the manual feed tray 94 is made to pivot toward the open position, a distance Rb between the center C of the pivotal shaft 94c and the sloped surface 934a, in the direction from the center C of the pivotal shaft 94c toward the contact portion H, gradually becomes shorter than a distance Ra between the center C of the pivotal shaft 94c and the contact portion H. In other words, when the manual feed tray 94 is made to pivot toward the open position and the contact portion H is first abutted to the sloped surface 934a, the distance Ra and the distance Rb are substantially equal. However, as the manual feed tray 94 is further made to pivot toward the open position, the distance Rb gradually becomes shorter than the distance Ra.

Accordingly, when the manual feed tray 94 is further made to pivot toward the open position after the contact portion H is abutted to the sloped surface 934a, the contact portion H presses the abutment portion 934 gradually downward, and hence the plate-shaped portion 933 is elastically deflected to a larger extent.

However, when the manual feed tray 94 is made to pivot toward the open position by the back-side end face of the automatic feed mechanism 81 (FIGS. 3 and 5), the contact portion H is restricted from stepping over the apex T of the abutment portion 934. In other words, the pressing force of the end face of the automatic feed mechanism 81 exerted on the manual feed tray 94 is not sufficient for allowing the contact portion H to step over the apex T. In addition, when the plate-shaped portion 933 is deflected by the self-weight of the manual feed tray 94, the deflecting force is set to be smaller than the resilient force originating from the elastic deflection of the plate-shaped portion 933 and exerted on the manual feed tray 94 by the sloped surface 934a, when the contact portion H reaches the apex T.

Therefore, when the manual feed tray 94 is made to pivot toward the open position by the back-side end face of the automatic feed mechanism 81 (FIGS. 3 and 5), the contact portion H is restricted from advancing further along the sloped surface 934a at a position on the sloped surface 934a lower than the apex T, and thus the manual feed tray 94 is restricted from pivoting further toward the open position. In other words, the manual feed tray 94 stops at an intermediate position between the open position and the closed position (stops moving). Here, the intermediate position does not always mean the middle point between the open position and the closed position. The intermediate position may be any position between the open position and the closed position.

However, when the user manually holds the manual feed tray 94 and makes it pivot in the opening direction (FIG. 6), a force sufficient for deflecting the plate-shaped portion 933 by a large amount is exerted on the plate-shaped portion 933 via the engagement between the contact portion H and the sloped surface 934a. Accordingly, the contact portion H is allowed to step over the apex T of the sloped surface 934a, so that the manual feed tray 94 can be set in the open position. The plate-shaped portion 933 is given sufficient elasticity to largely deflect without breaking down, even when the contact portion H steps over the apex T. In addition, after the contact portion H steps over the apex T in the opening process of the manual feed tray 94, the manual feed tray 94 is engaged with an engaging device (not shown) thus to be maintained in the open position. Here, the apex T corresponds to the topmost position of the abutment portion 934.

Further, the recording apparatus 10 includes a control unit 140 in addition to the foregoing constituents, as shown in FIG. 10. The control unit 140 serves to drive the recording head 50, the transport motor 41, the carriage motor 53, and so forth. The control unit 140 includes a communication interface 141 for communication with a computer PS via the communication interface 141.

Operation of Manual Feed Tray 94

The manual feed tray 94 of the thus-configured recording apparatus 10 operates as follows.

In the recording apparatus 10, normally the scanner unit 80 and the manual feed tray 94 are closed, as shown in FIGS. 2 and 4. However, the scanner unit 80 is made to pivot to the open position as shown in FIGS. 3 and 5, when the ink cartridge is to be replaced or a paper sheet jammed inside the recording apparatus 10 has to be removed. At this stage, the automatic feed mechanism 81 of the scanner unit 80 is also made to pivot together with the scanner mechanism 82. Accordingly, as shown in FIGS. 3 and 5, the back-side end face 80a of the automatic feed mechanism 81 presses the manual feed tray 94 thus making the manual feed tray 94 pivot toward the open position (clockwise in FIGS. 3 and 5). In this embodiment, the end face 80a is in contact with the openable cover 95 in the closed position shown in FIGS. 2 and 4, and hence the manual feed tray 94 is pressed via the openable cover 95. However, the end face 80a may be configured to press the manual feed tray 94 in direct contact therewith.

In the state illustrated in FIGS. 3 and 5, the deflection of the plate-shaped portion 933 is not sufficient for allowing the contact portion H to step over the apex T (see FIG. 9) of the abutment portion 934. Accordingly, the contact portion H of the manual feed tray 94 remains halfway of the sloped surface 934a, and hence the manual feed tray 94 is restricted from pivoting further toward the open position from the state shown in FIGS. 3 and 5.

When the scanner unit 80 is returned to the closed position shown in FIG. 2 from the open position shown in FIG. 3, the manual feed tray 94 is released from the pressing force so far exerted thereon by the back-side end face 80a of the automatic feed mechanism 81. Then the plate-shaped portion 933 is released from the deflecting force and restores the initial shape. Accordingly, the manual feed tray 94 is made to pivot in the closing direction (counterclockwise from the state shown in FIGS. 3 and 5). Thus, the manual feed tray 94 is reset to the closed position shown in FIGS. 2 and 4.

When the user manually holds the manual feed tray 94 and makes it pivot to the open position (to the state shown in FIG. 6), the plate-shaped portion 933 is subjected to a force sufficient for largely deflecting the plate-shaped portion 933, via the contact between the contact portion H and the sloped surface 934a. Accordingly, the contact portion H is allowed to step over the apex T of the sloped surface 934a so that the manual feed tray 94 is allowed to pivot further to reach the open position, thus to be engaged with the engaging portion (not shown) and so far in the open position. In the open position of the manual feed tray 94, the recording sheet P can be manually inserted into the recording apparatus 10 through the manual feed tray 94.

Advantageous Effects

With the thus-configured recording apparatus 10, when the scanner unit 80 is made to pivot from the closed position to the open position, the scanner unit 80 presses the manual feed tray 94 toward the open position. However, when the scanner unit 80 is made to pivot from the open position to the closed position, the manual feed tray 94 is reset to the closed position by the resetting member 932. Therefore, the manual feed tray 94 can be prevented from being left in the open position set by the opening motion of the scanner unit 80. Consequently, the manual feed tray 94 can be prevented from being unintentionally left in the open position.

In this embodiment, when the scanner unit 80 is made to pivot to the open position and then returned to the closed position, the manual feed tray 94 is automatically reset to the closed position by the resetting member 932. Therefore, the manual feed tray 94 can be prevented from being left in the open position. In particular, the manual feed tray 94 is often located behind the scanner unit 80, and hence the user is prone to overlook that the manual feed tray 94 has been opened. However, since the manual feed tray 94 is automatically reset to the closed position by the resetting member 932, the manual feed tray 94 can be prevented from being left in the open position.

The foregoing prevents, therefore, the manual feed tray 94 from being unintentionally left in the open position for a long time, and thus prevents intrusion of foreign matters such as dust into the recording apparatus 10 through the manual feed slot 91.

In this embodiment, when the manual feed tray 94 is at the intermediate position (FIG. 5) between the open position (FIG. 6) and the closed position (FIG. 4), a biasing force that urges the manual feed tray 94 toward the closed position is properly exerted thereon because of the elastic deflection of the plate-shaped portion 933. In addition, when the manual feed tray 94 is made to pivot further from the intermediate position toward the open position, the manual feed tray 94 is released from the biasing force of the plate-shaped portion 933, thus to be allowed to so far in the open position.

In this embodiment, further, when the manual feed tray 94 is made to pivot further from the intermediate position toward the open position, the contact portion H of the manual feed tray 94 slides along the sloped surface 934a resisting against the biasing force of the plate-shaped portion 933. When the manual feed tray 94 reaches a certain point on the way to the open position, the contact portion H is disengaged from the sloped surface 934a. At this stage, the contact portion H is no longer subjected to the biasing force of the plate-shaped portion 933 via the sloped surface 934a. Accordingly, the manual feed tray 94 is allowed to so far in the open position. Thus, the manual feed tray 94 can be set in the intermediate position and the open position, in addition to the closed position.

Second Embodiment

Hereunder, the recording apparatus 10 according to a second embodiment of the invention will be described referring to FIGS. 11 and 12. In the description of this embodiment, the same constituents as those of the first embodiment will be given the same numeral and the description thereof will not be repeated.

Figure 11:
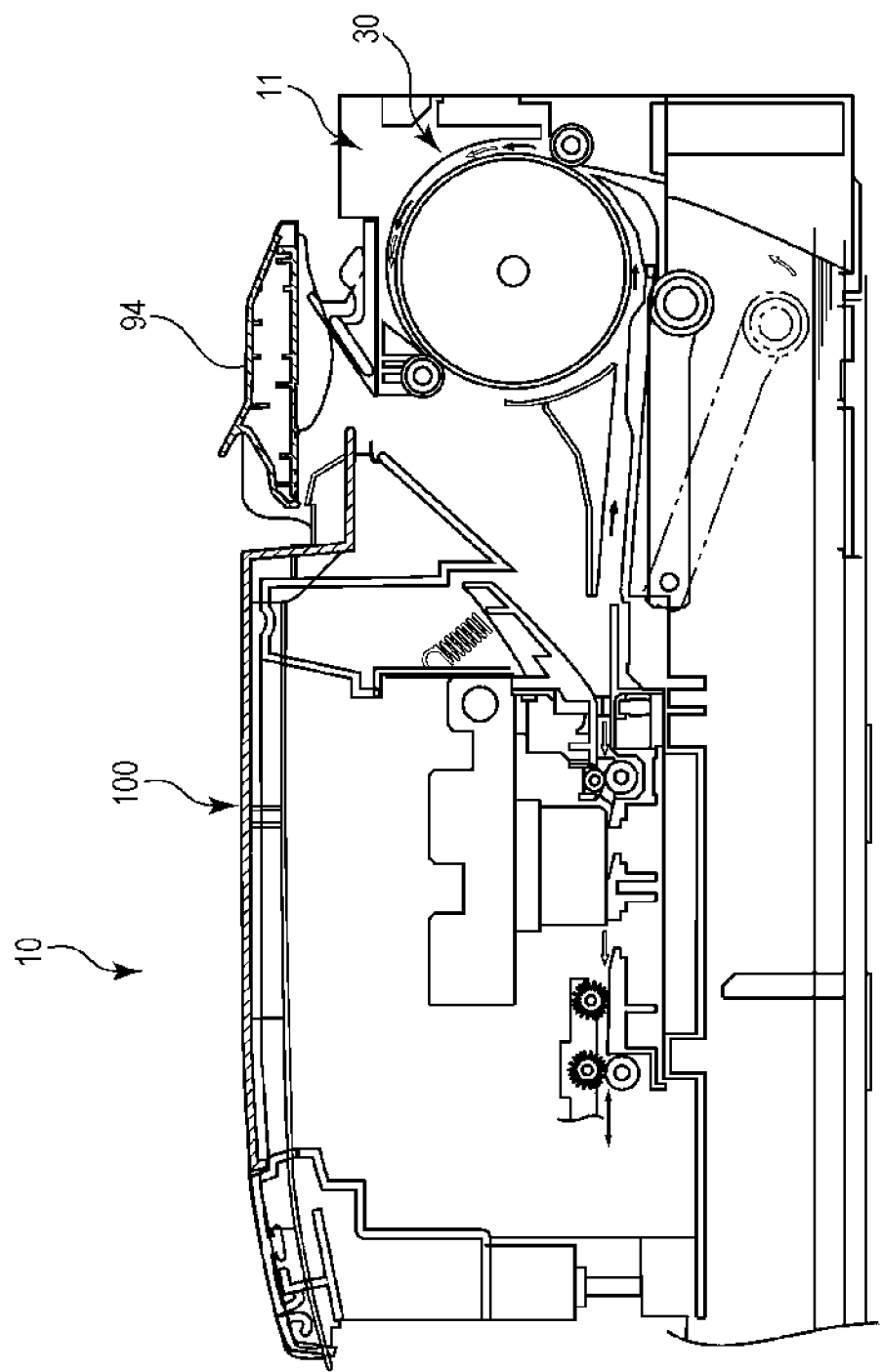
FIG. 11 is a cross-sectional view of a recording apparatus according to a second embodiment, in which a cover member is closed.

FIG. 11 is a cross-sectional view showing a configuration of the recording apparatus 10 according to the second embodiment, in which a cover member 100 and the manual feed tray 94 are closed. FIG. 12 is a cross-sectional view of the recording apparatus 10 in which the cover member 100 is opened and the manual feed tray 94 is pressed by the cover member 100.

In this embodiment, the pivotal member according to the invention is exemplified by the cover member 100, in place of the scanner unit 80 in the first embodiment. In other words, the cover member 100 is pivotally mounted on the back side of the casing 11, via a bearing which is not shown. In this embodiment, the cover member 100 is disposed to cover an opening formed in the upper face of the casing 11. Thus, in the closed position of the cover member 100 shown in FIG. 11, the cover member 100 is set to cover the opening.

When the cover member 100 is closed as shown in FIG. 11, the manual feed tray 94 is also closed. In the closed position, the manual feed tray 94 is laid down further forward toward the cover member 100, compared with the configuration of the first embodiment. In other words, in the state shown in FIG. 11 the manual feed tray 94 is laid down further counterclockwise compared with the configuration of the first embodiment. In the state shown in FIG. 11, the surface of the manual feed tray 94 oriented upward and the upper surface of the cover member 100 are generally flush with each other.

When the cover member 100 is opened from the closed position of the cover member 100 and the manual feed tray 94 as shown in FIG. 11, the surface of the cover member 100 presses the manual feed tray 94 to thereby make the manual feed tray 94 pivot in the opening direction (clockwise in FIG. 11). Thus, the surface of the cover member 100 presses the manual feed tray 94 toward the open position. In this process, while the cover member 100 is moving toward the open position, the contact portion H is abutted to the sloped surface 934a as shown in FIG. 12, and presses the abutment portion 934 gradually downward, such that the plate-shaped portion 933 becomes elastically deflected by a larger amount (see FIG. 5).

However, in this embodiment also, the contact portion H does not step over the apex T of the abutment portion 934, even when the cover member 100 reaches the open position. To be more detailed, even though the manual feed tray 94 is pressed by the surface of the cover member 100 to be made to pivot toward the open position, the contact portion H is restricted from advancing further on the sloped surface 934a at a position lower than the apex T, and therefore the manual feed tray 94 is restricted from pivoting further toward the open position. Accordingly, the contact portion H of the manual feed tray 94 remains in contact with the sloped surface 934a at a position halfway thereof. Thus, the manual feed tray 94 is restricted from pivoting further toward the open position from the state shown in FIGS. 5 and 12.

Figure 12:
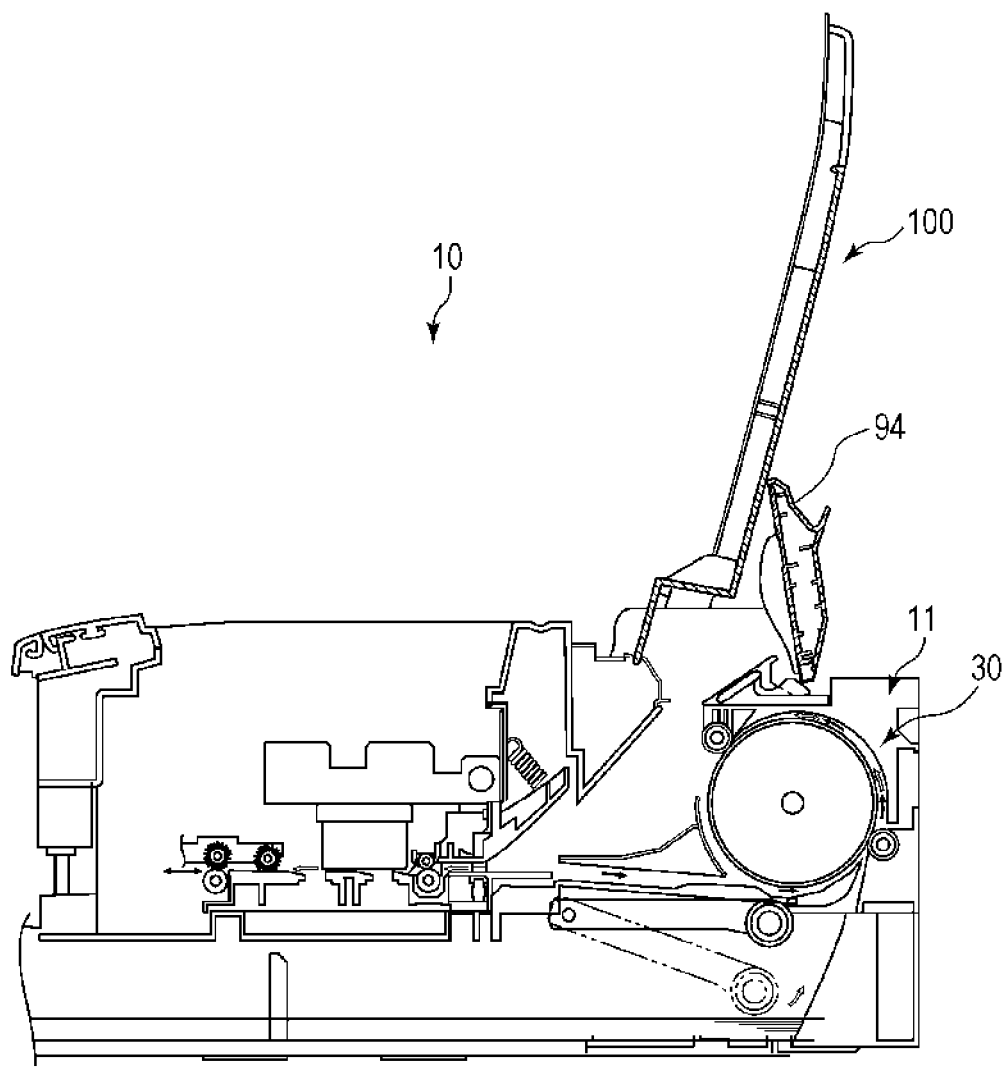
FIG. 12 is a cross-sectional view of the recording apparatus according to the second embodiment, in which the cover member is open.

When the cover member 100 is made to pivot in the closing direction from the state shown in FIGS. 5 and 12, the manual feed tray 94 is released from the pressing force so far exerted thereon via the surface of the cover member 100. Accordingly, the plate-shaped portion 933 is released from the deflecting force so far exerted thereon and restores the initial shape. Therefore the manual feed tray 94 is made to pivot in the closing direction (counterclockwise from the state shown in FIG. 5), thus to be reset to the closed position shown in FIGS. 4 and 11.

Here, in the case where the user manually holds the manual feed tray 94 and makes it pivot in the opening direction, the plate-shaped portion 933 is subjected to a force sufficient for largely deflecting the plate-shaped portion 933 as in the first embodiment, so that the contact portion H is allowed to step over the apex T of the sloped surface 934a. Then upon making the manual feed tray 94 pivot further in the opening direction, the manual feed tray 94 is engaged with the engaging portion (not shown) thus to so far in the open position. At this stage, the recording sheet P can be manually inserted into the recording apparatus 10 through the manual feed tray 94.

Advantageous Effects

As described above, the second embodiment of the invention also provides the advantageous effects as those provided by the first embodiment. Specifically, when the cover member 100 is made to pivot from the open position to the closed position, the manual feed tray 94 is reset to the closed position by the resetting member 932. Therefore, the manual feed tray 94 can be prevented from being left in the open position set by the opening motion of the cover member 100. Consequently, the manual feed tray 94 can be prevented from being unintentionally left in the open position.

In this embodiment also, when the manual feed tray 94 is at the intermediate position between the open position and the closed position, the biasing force that urges the manual feed tray 94 toward the closed position is properly exerted thereon, because of the elastic deflection of the plate-shaped portion 933. In addition, when the manual feed tray 94 is made to pivot further from the intermediate position toward the open position, the manual feed tray 94 is released from the biasing force of the plate-shaped portion 933, thus to be allowed to so far in the open position.

In this embodiment also, while the contact portion H is in contact with the sloped surface 934a the manual feed tray 94 can be located in the intermediate position, and when the contact portion H steps over the apex T of the sloped surface 934a thus to be disengaged therefrom, the manual feed tray 94 can be maintained in the open position. The manual feed tray 94 can also be reset to the closed position from the intermediate position, by the biasing force of the plate-shaped portion 933.

Further, when the cover member 100 is made to pivot to the open position and then returned to the closed position, the manual feed tray 94 is automatically reset to the closed position by the resetting member 932. Therefore, the manual feed tray 94 can be prevented from being left in the open position. In the configuration shown in FIGS. 11 and 12 also, the manual feed tray 94 is located behind the cover member 100, and hence the user is prone to overlook that the manual feed tray 94 has been opened. However, since the manual feed tray 94 is automatically reset to the closed position by the resetting member 932, the manual feed tray 94 can be prevented from being left in the open position.

Variations

Although the first and the second embodiment of the invention have been described as above, the invention may be modified in various manners. Some of the variations will be cited here below.

First Variation

In the first embodiment, when the entirety of the scanner unit 80 is made to pivot from the closed position to the open position the scanner unit 80 presses the manual feed tray 94, and when the entirety of the scanner unit 80 is made to pivot from the open position to the closed position the manual feed tray 94 is made to pivot toward the closed position by the resetting member 932. However, the same configuration may be adopted in the case where the automatic feed mechanism 81 is made to pivot, instead of the entirety of the scanner unit 80. More specifically, the automatic feed mechanism 81 may be configured to press the manual feed tray 94 upon being made to pivot from the closed position to the open position, and the manual feed tray 94 may be made to pivot toward the closed position by the resetting member 932 when the automatic feed mechanism 81 is made to pivot from the open position to the closed position.

With such a configuration also, the same advantageous effects as those provided by the first and the second embodiment can be obtained.

Second Variation

In the foregoing embodiments, the tray member according to the invention is exemplified by the manual feed tray 94. However, the tray member is not limited to the manual feed tray 94. For example, the tray member may be a paper feed tray provided independent of the manual feed tray. In other words, in the case where the paper feed tray is also configured to pivot between an open position and a closed position, the resetting member 932 configured as above may be employed, to thereby prevent the paper feed tray from being unintentionally left in the open position. Alternatively, the tray member may be embodied by the openable cover 95, in which case the openable cover 95 may be given a configuration compatible with the resetting member 932.

Third Variation

In the foregoing embodiments, the resetting member 932 includes the plate-shaped portion 933 exemplifying the biasing device formed so as to be elastically deflected. However, the biasing device is not limited to the plate-shaped portion 933. For example, spring members such as a torsion spring, a coil spring, or a leaf spring may be employed as the biasing device. In this case, it is preferable to constantly apply a biasing force to the manual feed tray 94 so as to the manual feed tray 94 toward the closed position. In the case where the manual feed tray 94 is constantly biased toward the closed position, the manual feed tray 94 is subjected to the biasing force exerted toward the closed position even when the manual feed tray 94 is set in the open position. Accordingly, a retention device that maintains the open position of the manual feed tray 94 may be additionally provided, to thereby retain the manual feed tray 94 when the manual feed tray 94 reaches the open position.

Fourth Variation

In the foregoing embodiments, the resetting member 932 is located at a generally central position of the tray base 93 in the width direction. Instead, the resetting device 932 may be located at an end portion of the tray base 93 in the width direction. In this case also, the resetting member 932 can equally apply the biasing force that automatically resets the manual feed tray 94 to the closed position. Alternatively, a pair of resetting devices may be provided at the respective end portions of the tray base 93 in the width direction, although a single piece of resetting device may be provided at either end portion of the tray base 93 in the width direction. Further, the resetting devices may be provided at the central position and either end portion of the tray base 93 in the width direction.

Fifth Variation

In the foregoing embodiments, the recording head 50 is attached to the carriage 51 set to reciprocate along the carriage shaft 56. Alternatively, the recording head may be line heads extending in the width direction of the recording sheet P and aligned in the transport direction thereof.

Sixth Variation

Further, the recording apparatus 10 according to the foregoing embodiments may be exemplified by a laser printer instead of the ink jet printer described above. In other words, the invention is also applicable to a laser printer. The recording apparatus 10 may encompass a fluid ejecting apparatus that ejects a liquid other than the ink, such as an ordinary liquid, a liquid containing particles of a functional material dispersed or mixed therein, or a gel-like fluid, and the invention is also applicable to such a fluid ejecting apparatus. Examples of such fluid ejecting apparatuses include those that eject a liquid containing, dispersed or dissolved therein, an electrode material or a color material (pixel material) for manufacturing LCDs, electroluminescence displays or field emission displays, those that eject a bioorganic substance for manufacturing biochips, and those employed as a precision pipette that ejects a liquid that serves as a specimen.

Seventh Variation

Further, examples of the recording apparatus 10 according to the invention include fluid ejecting apparatuses that eject a lubricant in a pinpoint manner to a precision instrument such as a watch or a camera, those that eject a clear resin fluid such as a UV-curable resin onto a substrate for manufacturing a micro hemispherical lens (optical lens) employed in an optical communication element, those that eject an acid or alkali etching solution for etching of a substrate or the like, and those that eject a gel-like fluid such as a physical gel.

The entire disclosure of Japanese Patent Application No.: 2012-130482, filed Jun. 8, 2012 is expressly incorporated by reference herein.

What is claimed is:

1. A recording apparatus comprising:
a casing of the recording apparatus;
a pivotal member provided on the casing so as to pivot between a closed position in which the pivotal member covers at least a part of the casing and an open position in which the pivotal member is away from the closed position;
a tray member disposed so as to pivot between an open position and a closed position with respect to the casing, and to be pressed to the open position by a pivoting motion of the pivotal member toward the open position; and
a resetting device that cancels the pressing force of the pivotal member when the pivotal member is made to pivot to the closed position, to thereby reset the tray member to the closed position,
wherein the resetting device includes a biasing device, and applies, when the pivotal member is moved toward the open position, a biasing force of the biasing device to the tray member so as to urge the tray member toward the closed position when the tray member is at an intermediate position between the open position and the closed position, and
the resetting device cancels the pressing force of the pivotal member to the tray member and maintains the tray member in the open position, after the tray member is set to the open position from the intermediate position against the biasing force of the resetting device.

2. The recording apparatus according to claim 1,
wherein the tray member is configured to support a medium to be fed therefrom and disposed so as to pivot about a pivotal shaft located between a downstream edge and an upstream of the medium in the transport direction of the medium placed on the tray member, and includes a contact portion located at a downstream end portion in the transport direction to be brought into contact with the resetting device, and
the resetting device is configured to apply the biasing force of the biasing device to the contact portion, release the contact portion from the biasing device when the tray member is set to the open position from the intermediate position, and maintain the tray member in the open position free from the biasing force of the biasing device.

3. The recording apparatus according to claim 1,
wherein the pivotal member is a scanner unit that can be opened and closed with respect to the casing, and
the tray member is a manual feed tray on which a recording medium is placed each time the recording medium is put to use, the manual feed tray being independent from a paper feed tray capable of receiving a plurality of recording media and configured to feed the recording media to a splitting mechanism that allows only a single piece of recording medium to be delivered.

4. The recording apparatus according to claim 1,
wherein the pivotal member is a cover member that can be opened and closed with respect to the casing, the cover member being set to cover an upper face of the casing in the closed position, and
the tray member is a manual feed tray on which a recording medium is placed each time the recording medium is put to use, the manual feed tray being independent from a paper feed tray capable of receiving a plurality of recording media and configured to feed the recording media to a splitting mechanism that allows only a single piece of recording medium to be delivered.

5. The recording apparatus according to claim 1,
wherein the pivotal member is an automatic feed mechanism that transports a source document to a position where an image sensor reads the source document, and
the tray member is a manual feed tray on which a recording medium is placed each time the recording medium is put to use, the manual feed tray being independent from a paper feed tray capable of receiving a plurality of recording media and configured to feed the recording media to a splitting mechanism that allows only a single piece of recording medium to be delivered.

* * * * *